(12) United States Patent
Barcewicz et al.

(10) Patent No.: US 12,676,758 B1
(45) Date of Patent: Jul. 7, 2026

(54) SECURELY PROVIDING DATA FROM A SOURCE ENTITY FOR TRAINING A MODEL OF A MODEL ENTITY

(71) Applicant: Marvell Asia Pte, Ltd., Singapore (SG)

(72) Inventors: Krzysztof Barcewicz, Gdansk (PL); Steven Craig Barner, Shrewsbury, MA (US); Maciej Koprowski, Gdansk (PL)

(73) Assignee: Marvell Asia Pte Ltd, Singapore (SG)

( * ) Notice: Subject to any disclaimer, the term of this patent is extended or adjusted under 35 U.S.C. 154(b) by 176 days.

(21) Appl. No.: 18/790,050

(22) Filed: Jul. 31, 2024

Related U.S. Application Data

(60) Provisional application No. 63/537,456, filed on Sep. 8, 2023.

(51) Int. Cl.
 *H04L 9/32* (2006.01)
(52) U.S. Cl.
 CPC ................................. *H04L 9/3247* (2013.01)
(58) Field of Classification Search
 CPC .................................................... H04L 9/3247
 USPC .......................................................... 713/176
 See application file for complete search history.

(56) References Cited

U.S. PATENT DOCUMENTS

| | | | | |
|---|---|---|---|---|
| 11,323,258 B2 * | 5/2022 | Thekadath | ............ | H04L 9/3247 |
| 12,562,179 B2 * | 2/2026 | Fukui | ................. | G10L 21/0208 |
| 2022/0084492 A1 * | 3/2022 | Daido | ...................... | G10H 7/08 |
| 2023/0153573 A1 * | 5/2023 | Principe | ................. | G06N 3/084 |
| | | | | 706/15 |
| 2025/0379746 A1 * | 12/2025 | Kido | ...................... | G06F 21/33 |

OTHER PUBLICATIONS

Stokes, Jack W. et al., "Preventing Machine Learning Poisoning Attacks Using Authentication and Provenance", arXiv, 9 pages, May 20, 2021, DOI: 10.48550/arXiv.2105.10051 <https://doi.org/10.48550/arXiv.2105.10051>.
Nathalie Baracaldo et al., "Mitigating Poisoning Attacks on Machine Learning Models: A Data Provenance Based Approach", AISec '17: Proceedings of the 10th ACM Workshop on Artificial Intelligence and Security, pp. 103-110, Nov. 2017, DOI: 10.1145/3128572. 3140450.

* cited by examiner

*Primary Examiner* — Linglan Edwards
*Assistant Examiner* — Phuc Pham

(57) ABSTRACT

In one aspect, in general, a system for securely providing data for training a model comprises: a source entity comprising at least one processor and configured to: receive data configuration instructions associated with training the model, transform unprepared data from one or more data sources into prepared data based at least in part on the data configuration instructions, the prepared data comprising one or more prepared data units, and produce, using a signing module, a data package comprising the one or more prepared data units and a respective signature object associated with each of the one or more prepared data units; wherein the signing module comprises specialized circuitry configured for accelerating at least one quantum resistant computational operation.

42 Claims, 5 Drawing Sheets

SECURELY PROVIDING DATA FROM A SOURCE ENTITY FOR TRAINING A MODEL OF A MODEL ENTITY

CROSS-REFERENCE TO RELATED APPLICATION(S)

This application claims priority to and the benefit of U.S. Provisional Application Ser. No. 63/537,456, entitled "Protecting AI Models from Data Poisoning," filed Sep. 8, 2023, the entire disclosure of which is hereby incorporated herein by reference.

TECHNICAL FIELD

This disclosure relates to securely providing data from a source entity for training a model of a model entity.

BACKGROUND

Developing artificial intelligence and machine learning models can depend on training a model using large sets of data transferred from data sources. In some examples, training data can be manipulated or altered during transfer, potentially altering model outcomes. Some techniques for addressing this possibility use data provenance techniques to process untrusted data based on provenance data.

SUMMARY

In one aspect, in general, a method for securely providing data from a source entity for training a model of a model entity comprises: at the source entity: receiving data configuration instructions associated with the model entity, transforming unprepared data from one or more data sources into prepared data based at least in part on the data configuration instructions, the prepared data comprising one or more prepared data units, producing, using a signing module, a data package comprising the one or more prepared data units and a respective signature object associated with each of the one or more prepared data units, and providing the data package to the model entity; and at the model entity: accessing the provided data package, verifying, using a verification module, each of the signature objects associated with the prepared data units in the provided data package, and providing the prepared data to a trainer module using a secure communication channel configured to provide a trusted link between the verification module and the trainer module.

Aspects can include one or more of the following features.

Providing the data package to the model entity comprises transmitting the data package from the source entity to the model entity over one or more communication channels.

At least one communication channel of the one or more communication channels is routed through one or more intermediate entities configured to receive the data package and transmit the data package to a subsequent intermediate entity.

Providing the data package to the model entity comprises storing the data package at a storage medium for a period of time after which the model entity accesses the storage medium and verifies each of the signature objects associated with the prepared data units.

Providing the data package to the model entity further comprises verifying each of the signature objects associated with the prepared data units before storing the data package at the storage medium.

The secure communication channel comprises a wired connection between the verification module and the trainer module.

The wired connection comprises a peripheral component interconnect express connection.

The secure communication channel comprises a wireless private network connection between the verification module and the trainer module.

The trainer module comprises a hardware configuration and the data configuration instructions are based at least in part on the hardware configuration.

The hardware configuration comprises one or more graphics processing units.

The hardware configuration comprises one or more central processing units.

The trainer module of the model entity comprises a model configuration and the data configuration instructions are based at least in part on the model configuration.

The trainer module of the model entity comprises a machine learning framework and the data configuration instructions are based at least in part on the machine learning framework.

The trainer module of the model entity comprises a development environment and the data configuration instructions are based at least in part on the development environment.

The signature objects associated with each of the one or more prepared data units are generated based at least in part on at least one quantum resistant operation.

The signature objects associated with each of the one or more prepared data units are generated based at least in part on a hash function.

The signing module comprises a cryptographic module configured to generate signature objects associated with each of the one or more prepared data units, and the signature objects are based at least in part on at least one quantum resistant operation.

The source entity comprises the signing module and the verification module.

The signing module comprises specialized circuitry configured to produce the signature objects.

The signing module comprises a particular hardware and software architecture, and the verification module comprise the same particular hardware and software architecture.

In another aspect, in general, a system comprises: a source entity configured to: receive data configuration instructions associated with the model entity, transform unprepared data from one or more data sources into prepared data based at least in part on the data configuration instructions, the prepared data comprising one or more prepared data units, produce, using a signing module, a data package comprising the one or more prepared data units and a respective signature object associated with each of the one or more prepared data units, and transmit the data package to the model entity over one or more communication channels; and a model entity configured to: receive the transmitted data package from the model entity, verify, using a verification module, each of the signature objects associated with the prepared data units in the provided data package, and provide the prepared data to a trainer module using a secure communication channel configured to provide a trusted link between the verification module and the trainer module.

The signing module comprises specialized circuitry configured for accelerating at least one quantum resistant computational operation.

The verification module comprises specialized circuitry configured for accelerating at least one quantum resistant computational operation.

The data configuration instructions comprise a hardware configuration associated with the model entity.

The data configuration instructions comprise a development environment associated with the model entity.

The secure communication channel comprises a wired connection, a wireless connection, or some combination thereof.

In another aspect, in general, a system comprises: a storage medium; a source entity configured to: receive data configuration instructions associated with the model entity, transform unprepared data from one or more data sources into prepared data based at least in part on the data configuration instructions, the prepared data comprising one or more prepared data units, produce, using a signing module, a data package comprising the one or more prepared data units and a respective signature object associated with each of the one or more prepared data units, and store the data package in the storage medium; and a model entity configured to: access the provided data package from the storage medium, verify, using a verification module, each of the signature objects associated with the prepared data units in the provided data package, and provide the prepared data to a trainer module using a secure communication channel configured to provide a trusted link between the verification module and the trainer module.

Aspects can include one or more of the following features.

The signing module comprises specialized circuitry configured for accelerating at least one quantum resistant computational operation.

The verification module comprises specialized circuitry configured for accelerating at least one quantum resistant computational operation.

The source entity prepares a plurality of data packages each associated with different respective data configuration instructions and stores the plurality of data packages in the storage medium.

In another aspect, in general, a system for securely providing data for training a model comprises: a source entity comprising at least one processor and configured to: receive data configuration instructions associated with training the model, transform unprepared data from one or more data sources into prepared data based at least in part on the data configuration instructions, the prepared data comprising one or more prepared data units, and produce, using a signing module, a data package comprising the one or more prepared data units and a respective signature object associated with each of the one or more prepared data units; wherein the signing module comprises specialized circuitry configured for accelerating at least one quantum resistant computational operation.

Aspects can include one or more of the following features.

A quantum resistant operation that the specialized circuitry is configured to accelerate is a post-quantum cryptography algorithm.

The specialized circuitry includes circuitry configured to accelerate one or more of the following operations: modular exponentiation of large integers, multiplication of points on an elliptical curve, polynomial multiplication, or Keccak algorithms.

Each signature object is generated at least in part using a hash function.

The data configuration instructions comprise a hardware configuration associated with training the model.

In another aspect, in general, a system for securely receiving data for training a model, comprises: a model entity comprising at least one processor and configured to: access a data package comprising the one or more prepared data units and a respective signature object associated with each of the one or more prepared data units, where the prepared data units were prepared based at least in part on the data configuration instructions associated with training the model, verify, using a verification module, each of the signature objects associated with the prepared data units in the provided data package, and provide the prepared data to a trainer module using a secure communication channel configured to provide a trusted link between the verification module and the trainer module; wherein the verification module comprises specialized circuitry configured for accelerating at least one quantum resistant computational operation.

Aspects can include one or more of the following features.

The specialized circuitry of the verification module is configured for accelerating at least one quantum resistant computational operation associated with a post-quantum cryptography algorithm.

The secure communication channel comprises a wired connection between the verification module and the trainer module.

The secure communication channel comprises a wireless connection between the verification module and the trainer module.

The secure communication channel comprises a combination of at least one wireless connection and at least one wired connection between the verification module and the trainer module.

A quantum resistant operation that the specialized circuitry is configured to accelerate is a post-quantum cryptography algorithm.

The specialized circuitry includes circuitry configured to accelerate one or more of the following operations: modular exponentiation of large integers, multiplication of points on an elliptical curve, polynomial multiplication, or Keccak algorithms.

Aspects can have one or more of the following advantages.

Developing artificial intelligence or machine learning models can comprise providing large training data sets to a model entity. A model can be influenced by an adversary tampering with or modifying these training data sets such that the model behaves adversely. Methods of providing data to a trainer module of a model entity can be implemented such that tampering or modification of the data can be detected before it reaches the trainer module. In such an implementation, an adversary influencing a model through model poisoning can be detected and mitigated by redirecting tampered or modified data away from the model. Such implementations can allow for data to be transferred between untrusted intermediate entities or stored for periods of time before being utilized to train a model.

Some aspects of the techniques described herein pertain to the preparation, protection, and verification of training data. Hardware and software techniques can be utilized to ensure that training data can be transferred securely. In addition, a data processing system can be implemented to accelerate the process of securing data, specifically in the protection and verification procedures.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The rapidly developing field of artificial intelligence (AI) utilizes hardware and software techniques to replicate behaviors typically associated with intelligent beings, such as problem solving, learning, and adaptability. Technological innovations and advances have prompted a wide range of industries to increasingly leverage AI as a resource to enhance and expand their current capabilities. Industry interest has also focused on a subfield of AI known as machine learning (ML), as well as its subfield deep learning, in order to develop hardware and software implementations that are capable of completing tasks without explicit inputs.

Current implementations of AI and ML rely on training and validating models, or programs comprising algorithms designed to analyze and detect statistical patterns in data. The process of training models can comprise providing large sets of curated data to a model and then prompting the model to make predictions or extrapolate from the curated data. Some implementations of model training can incorporate a feedback mechanism, wherein predictions and extrapolations are evaluated and the results of the evaluation are provided back to the model. A model can be deployed once it produces satisfactory or desired outcomes. Throughout the process of training and deploying a model, a variety of validation techniques can be utilized to assess the model or improve the chances of developing a successful model. For instance, the process of model validation evaluates the ability of a model to make desired predictions outside the initial curated data.

The development and deployment of a reliable and effective model is highly dependent on the training and validation processes, and a model can be inadvertently or intentionally influenced at any point throughout these processes. Model poisoning, in which an AI or ML model is intentionally manipulated or compromised by an adversary, can be a major concern in developing models. Model poisoning can occur when an adversary provides the model with "poisoned," or malicious and misleading data, thereby influencing the outcomes or behaviors of a model. A poisoned data set, even one representing a small percentage of the body of training data, can still influence an AI model. Huge, secure, and good-quality datasets are thus highly desired to train and validate models that might be integrated into critical operations without model poisoning. In particular, entities seeking to build and develop their own models "in-house" using data imported from external third parties or internal data harvested from the past can benefit from techniques to ensure and secure data integrity.

Some aspects of the techniques disclosed herein pertain to preparing and securing training data provided to a training model to prevent model poisoning. A combination of hardware and software solutions, including post-quantum cryptography algorithms, can be utilized to ensure the integrity of model training data.

Figure 1A:
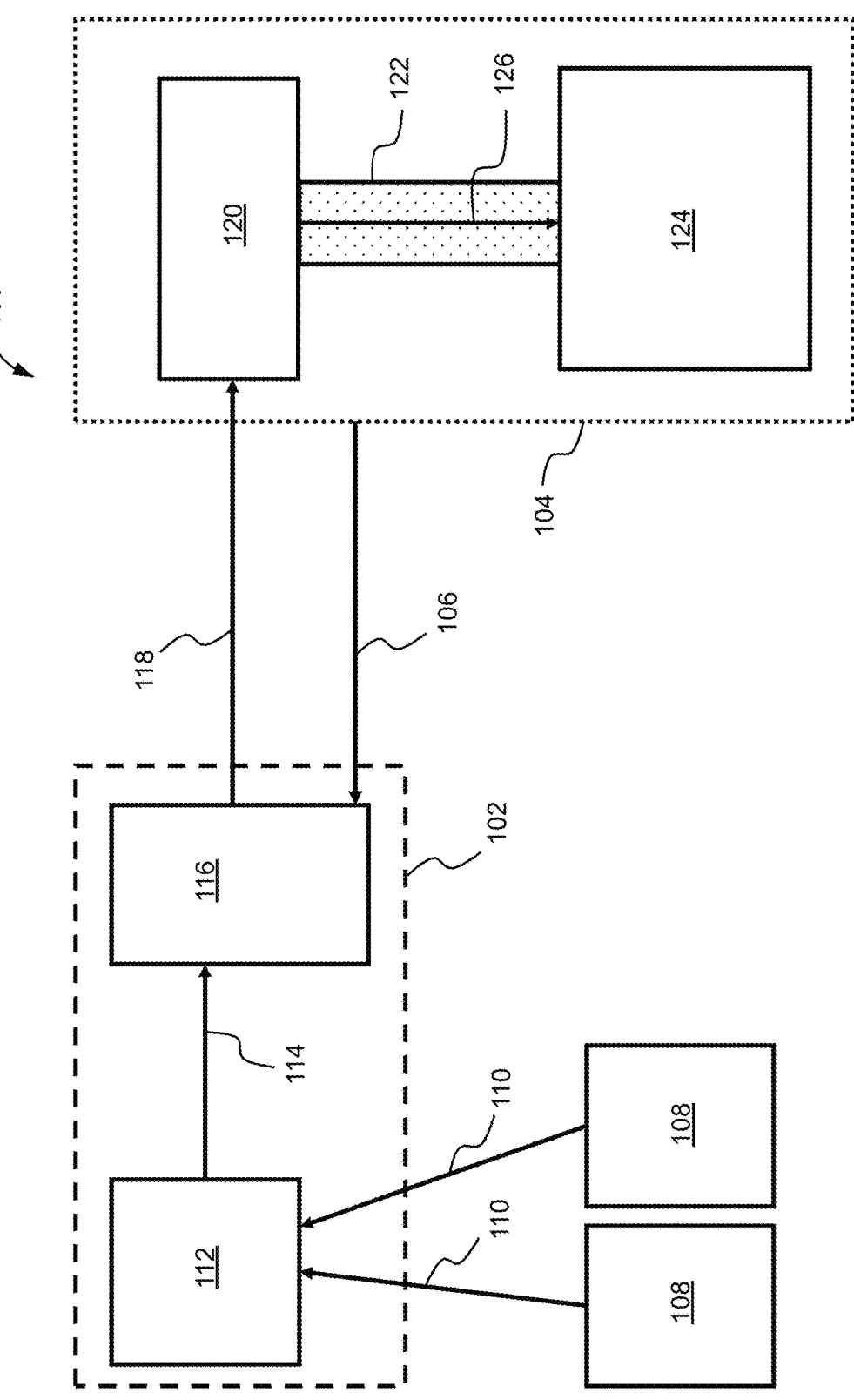
FIG. 1A is a schematic diagram of an example configuration for securely providing data to a model entity.

FIG. 1A shows an example configuration 100 for securely providing data from a source entity 102 to a model entity 104. In this configuration 100, the source entity 102 receives data configuration instructions 106 associated with a model entity 104. The source entity 102 utilizes a data transformer 112 configured based at least in part on the data configuration instructions 106 to transform unprepared data 110 from one or more data sources 108 into prepared data 114. In some cases, the data sources 108 can be part of or otherwise local to the source entity 102, or in other cases, the data sources 108 can be external but in communication with the source entity 102 over trusted communication and/or storage channels such that confidence is high that no tampering has taken place. The source entity 102 uses a signing module 116 to produce a data package 118 by attaching signature objects to the prepared data 114. The data package 118 is provided to the model entity 104, which comprises a verification module 120 that verifies the signature objects of the data package 118. Following verification, verified prepared data 126 is provided to a trainer module 124 over a secure communication channel 122.

Figure 1B:
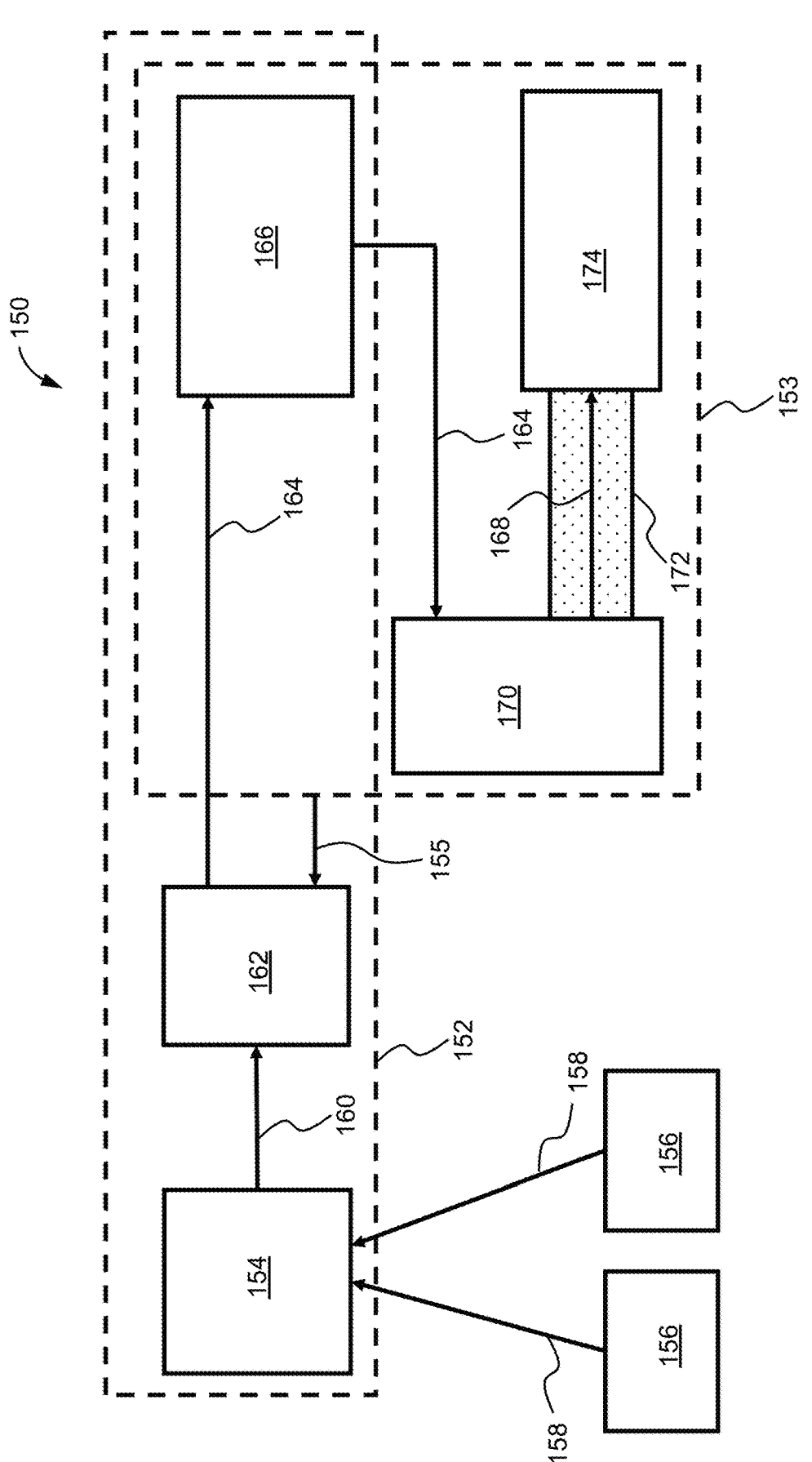
FIG. 1B is a schematic diagram of an example configuration for securely providing data to a model entity.

In some examples, a source entity and a model entity can overlap and include one or more shared modules, as shown in FIG. 1B. In a configuration 150, a source entity 152 receives unprepared data 158 from one or more data sources 156. The source entity 152 receives data configuration instructions 155 associated with a model entity 153. The source entity 152 utilizes a data transformer 154 configured based at least in part on the data configuration instructions 155 to transform the unprepared data 158 into prepared data 160. A signing module 162 produces a data package 164 by attaching signature objects to the prepared data 160. The data package 164 is received by a data storage module 166 that is securely accessible by both the source entity 152 and the model entity 153. After some time, the data package 164 is received by a verification module 170 in the model entity 153 that verifies the signature objects of the data package 164. Following verification, the verified prepared data 168 is provided to a trainer module 174 over a secure communication channel 172.

In some examples, a source entity can prepare one or more data packages based at least in part on configuration instructions associated with one or more model entities. The source entity can then store the one or more data packages for some period of time. The data packages can then be provided to a model entity depending on the data configuration associated with the model entity.

Figure 2:
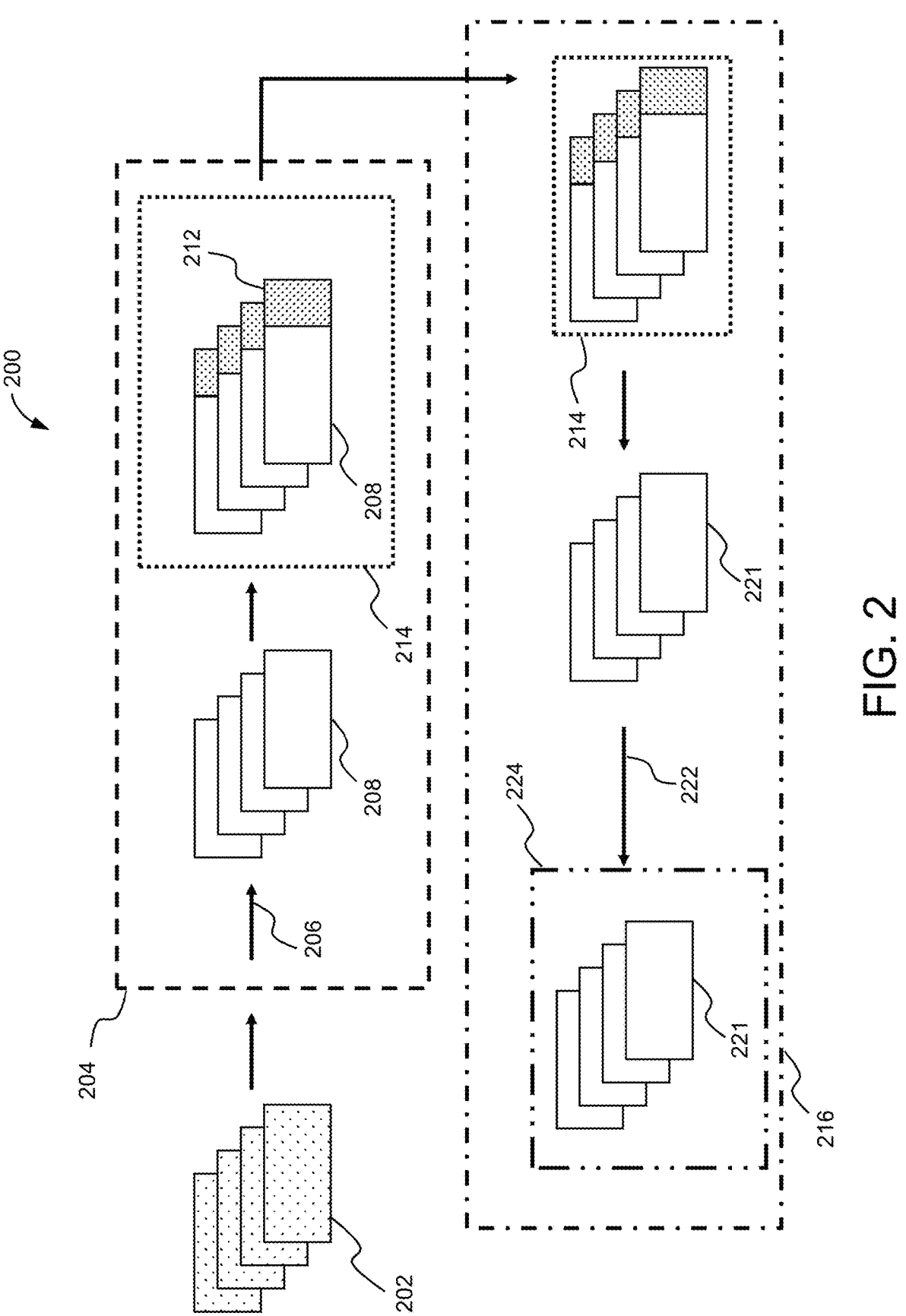
FIG. 2 is a schematic diagram of an example of data being securely provided to a model entity.

FIG. 2 contains an example flow of data from a source entity to a trainer module of a model entity. In this configuration 200, a source entity 204 receives unprepared data 202 from one or more data sources (not shown). The source entity 204 performs a data transformation 206 to convert the unprepared data 202 into one or more prepared data units 208. A signing module (not shown) is used to prepare a data package 214 comprising one or more prepared data units 208 with a respective signature object 212 associated with each of the one or more prepared data units 208. A model entity 216 receives the data package 214 and uses a verification module (not shown) to verify signature objects associated with one or more of the prepared data units and produce verified prepared data units 221. Finally, a secure communication channel 222 provides a trainer module 224 with verified prepared data units 221 for use in training a model.

Transforming unprepared data from data sources into prepared training data units for a model can comprise one or more aspects, or some combination thereof. In some examples, a source entity can collect and/or combine data from one or more data sources into a set of data (also referred to as a dataset). Some data sources can provide data of varying data formats and sizes to a source entity. A source entity can convert all data files into a standardized format to simplify the data transformation. For instance, categorical data can be converted into numerical form or continuous variables can be normalized. In some examples, the source entity can explore the unprepared or prepared data using specialized data preparation tools. Additionally, a source entity can employ mathematical operations to clean any data and/or to select relevant features from the dataset using feature selection methods. For instance, a source entity can purify data to eliminate any missing values, outliers, or inconsistent information in order to reduce noise, provide a more precise depiction of the data, or prevent adverse performance of a model. A source entity can also partition the data into training and testing datasets to assess model performance or reduce the dimensionality of datasets to expedite model training and/or reduce the risk of a statistical algorithm overfitting the data, which can skew the performance of a model. In some cases, transforming the unprepared data can also include augmenting the unprepared data received from the data sources with additional data (e.g., synthetic or generated data) that is included in the prepared training data units.

Some trainer modules are optimized to run on one or more hardware infrastructures that can accelerate the analysis of the data input and production of models. For instance, some trainer modules are optimized to run on a particular hardware infrastructure, e.g., graphics processing units (GPUs), central processing units (CPUs), tensor processing units (TPUs), field-programmable gate arrays (FPGAs), application-specific integrated circuits (ASICs), data processing units (DPUs), or neural network processors (NNPs). Some trainer modules can comprise a combination of hardware infrastructures. Trainer modules optimized to run on a particular hardware infrastructure can require training data having one or more specific formats. In some examples, these specific formats can be associated with efficient utilization of resources associated with a hardware infrastructure, i.e., power consumption or available computational resources. In some examples, efficient utilization of computational resources comprises balancing factors such as available memory, data throughput, data transfers between memory units, or latency. In some examples, data configuration instructions associated with a model entity can be based in part on the hardware infrastructure associated with a trainer module.

Some hardware infrastructures can be optimized to produce models using prepared data that has been batched such that computational resources, e.g., memory, associated with the hardware infrastructures are efficiently utilized during processing of the batches. Data configuration instructions associated with such hardware infrastructures can comprise dividing training data into batches to optimize computational resource usage with training data throughput.

Some trainer modules comprise software platforms or development environments that are configured and optimized to produce models. In some examples, this optimization can be associated with higher data throughputs or lower hardware resource usage. For instance, development environments such as Python or TensorFlow can be utilized to generate model entities based on training data. Some development environments comprise machine learning frameworks that require training data to be in a particular format in order to proceed with training. Some development environments comprise functions specifically designed to load, preprocess, and manipulate data having a particular format. Some software platforms or development environments are optimized perform tasks such as data transfer or preprocessing on data having a particular format. In some examples, data configuration instructions provided to a source entity can comprise a data format based at least in part on the development environment or software platform comprising a trainer module. A source entity can transform data received from a data source based on one or more data formats accepted or required by a particular trainer module of a model entity. The data transformation performed by a source entity can also ensure data format compatibility across various models and sizes. Some software platforms or development environments can also be optimized to produce models using a hardware configuration. In such instances, data configuration instructions can comprise a format based on a hardware configuration associated with a software platform or development environment.

In some examples, a source entity can own the data received from the data sources or can possess the right to share it with other parties.

Following the production of the prepared data units, the source entity creates a data package for transmission to the model entity by attaching signature objects to each prepared data units. Some examples of data signing comprise utilizing a hash function to produce a signature object associated with a data unit. Some hash functions produce a unique output associated with an input, for instance a data unit. In some hash-based signature implementations, checking a hashed signature object with its associated data unit can determine if the data unit has been modified during transmission. A verification module can be utilized to verify a signature object and check for prepared data units that have been modified following their transmission from the source entity. Any modified data can then be discarded from training data such that a model is not influenced or "poisoned" by the modified data. "Signing" the prepared data in this way can allow for entities to transfer datasets along transmission channels or store datasets for later access while also detecting if one or more adversaries tamper with the data. For instance, in some examples, the data package can be transferred through intermediaries along unsecured transmission channels before reaching the model entity. In some examples, the data package can be stored internally by a model training host for some period of time before being used to train a model.

In some examples, a model entity can notify the source entity of any modified data that was discarded from the training data. The source entity can then prepare, sign, and resend a portion of the training data such that the model entity can utilize the training data to train the model.

In some examples, producing and validating the signature objects can comprise robust mechanisms for detecting any attempts to replace individual dataset units or entire groups of datasets. These mechanisms can produce and verify signatures generated by Post-Quantum Cryptography (PQC) algorithms, such as CRYSTALS-Dilithium (also referred to as simply "Dilithium") or FALCON or other lattice-based algorithms, or SPHINCS$^+$ or other hash-based algorithms. Other PQC algorithms or hash-based signature schemes can also be utilized to produce and verify signatures, such as the Leighton-Micali Signature (LMS) system, the eXtended Merkle Signature Scheme (XMSS), and multi-tree variants including the Hierarchical Signature System (HSS) and multi-tree XMSS (XMSS$^{MT}$). In theory, PQC algorithms can be utilized to secure data from attackers utilizing quantum computers, which can have higher computational capabilities than current classical computers. Such PQC algorithms, and computational operations included therein, can be referred to as "quantum resistant" because they are configured to be resistant to known quantum computational techniques for efficiently solving certain cryptographic primitives.

Figure 3:
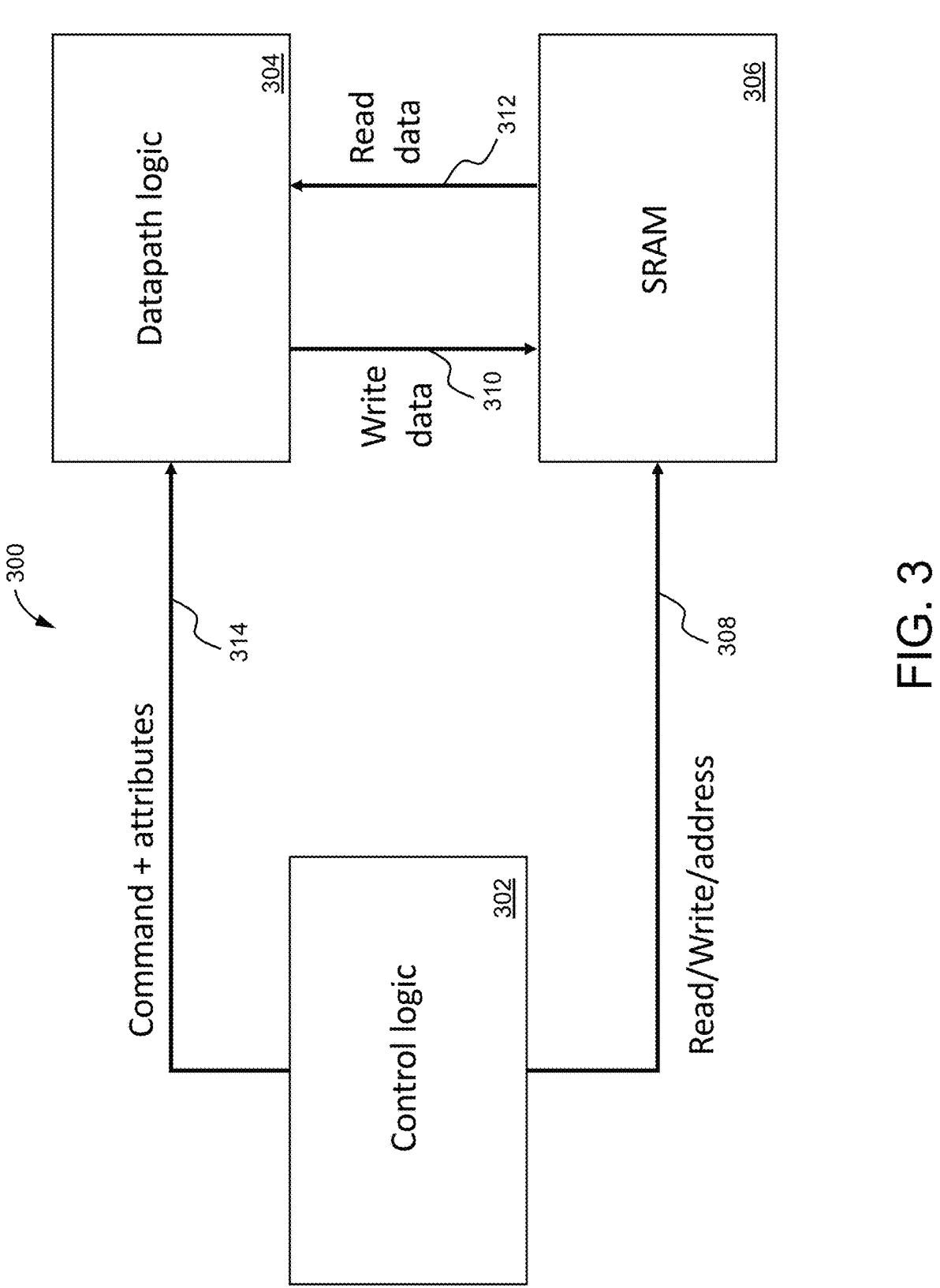
FIG. 3 is a schematic diagram of an example configuration of a PQC hardware accelerator.

In some implementations of cryptographic algorithms, software-only architectures perform operations using a Central Processing Unit (CPU). Such implementations can run on arbitrary computer hardware, but the performance of the operation can depend on the computation capabilities of the CPU. In addition, such software-only architectures can be less efficient at utilizing available hardware resources. These factors can increase the operation time required to sign and verify prepared data units. A dedicated sign and verify hardware accelerator can be utilized in some implementations to improve a computation process associated with a cryptographic algorithm by optimizing the hardware resources devoted to performing operations. In some examples, a sign and verify hardware accelerator can be configured to accelerate operations associated with a PQC algorithm. FIG. 3 depicts an example of a low-level hardware design 300 that can be utilized as a sign and verify accelerator in a signing module, verifier module, or both. The design comprises control logic 302, datapath logic 304 (e.g., polynomial multiplication, hash, etc.), and static random-access memory (SRAM) 306. In other implementations, other kinds of memory modules could be used instead of or in addition to an SRAM. The control logic 302 provides commands and attributes 314 to the datapath logic 304 and performs read, write, and address operations 308 on the SRAM 306. The datapath logic 304 writes operational data 310 to the SRAM 306 or reads operational data 312 from the SRAM 306. In some implementations, the datapath logic 304 can comprise specialized hardware components that are optimized to perform specific computations related to cryptographic algorithms, including modular exponentiation of large integers, multiplication of points on an elliptical curve, polynomial multiplication, or Keccak algorithm operations. The SRAM 306 contains the operation data while the control logic 302 manages the operations.

Some examples of sign and verify hardware accelerators configured for PQC algorithms can implement an efficient Number Theoretic Transform (NTT), an algorithm used for efficient multiplication of large degree polynomials with integer coefficients. The NTT hardware implementation can be used for lattice-based cryptographic signature schemes (e.g., Dilithium) both in the sign and verification steps.

Some examples of PQC hardware implementations, such as the system described above, can also provide acceleration for hash functions, such as Keccak which is used for XOF/PRD configurations. For some hash-based signature schemes, e.g., Leighton-Micali Hash-Based Signatures (LMS) and Hierarchical Signature Schemes (HSS), the PQC hardware accelerator can implement efficient iterative hashing of data in loops. Such loops of iterative hashing can be used both in the sign and verification steps.

To further improve the performance of hash-based signing, a hardware security module can manage precomputing and secure storage of hashes for some of the nodes in the hash tree associated with the keys of the given instance of the signature scheme.

Figure 4:
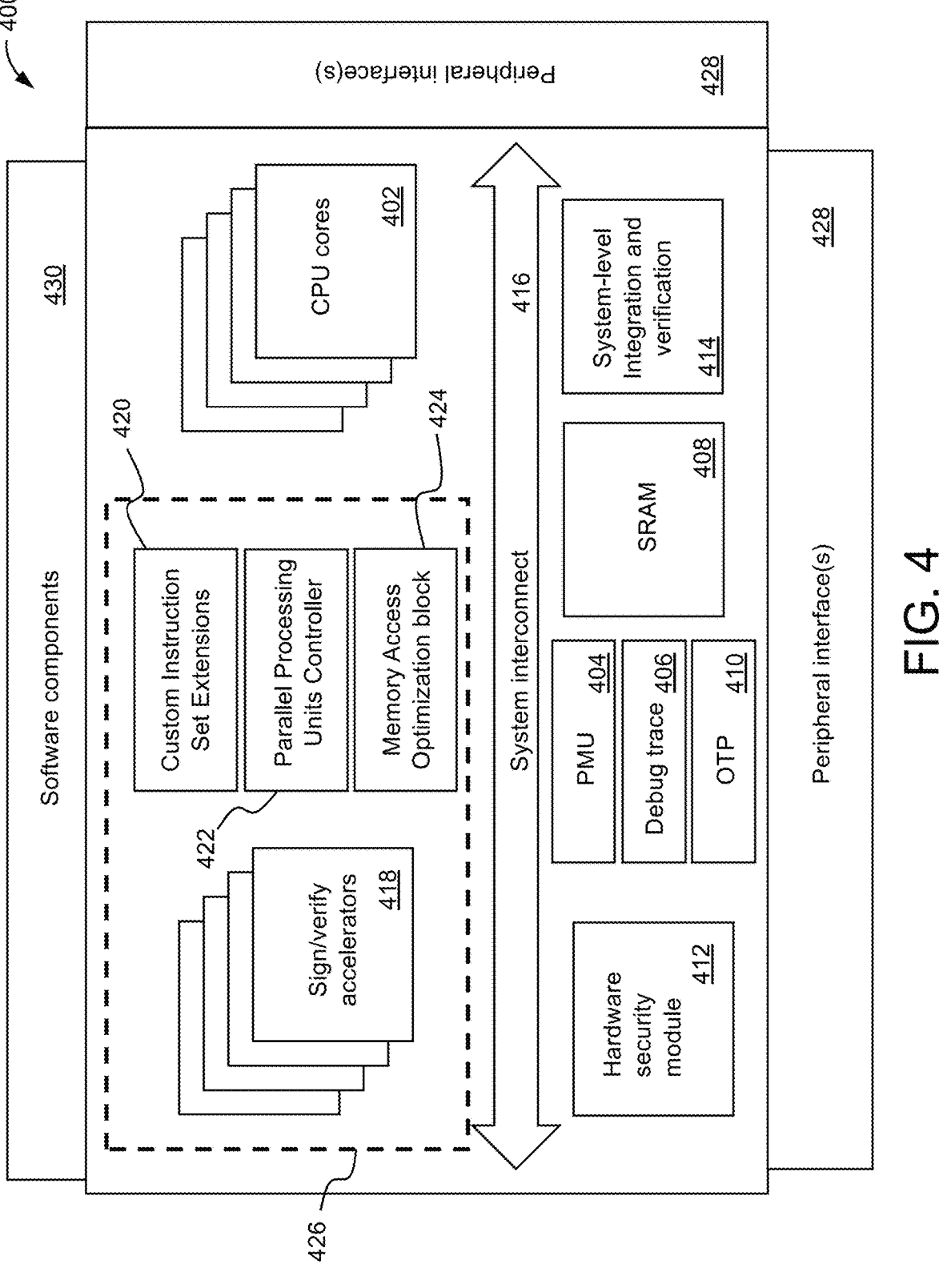
FIG. 4 is a schematic diagram of an example configuration of a system-on-chip accelerator.

In some examples, the signing module can utilize a combination of hardware architecture, software, and cryptographic algorithms to secure prepared data units. Some configurations of this combination can involve a system-on-chip (SoC) hardware architecture, embedded software, and cryptographic algorithms specifically designed for signature purposes to attach a signature object to each prepared data unit. An example system-on-chip (SoC) 400 is depicted in FIG. 4. In this example, the SoC 400 comprises modules that include Central Processing Unit (CPU) cores 402, a Power Management Unit (PMU) 404, a Debug/Trace Module 406, Static Random Access Memory (SRAM) utilized by an embedded system for its memory requirements 408, One-Time-Programmable Memory (OTP) 410, a hardware security module 412, and a System-Level Integration and Verification module 414. In some implementations, a hardware security module can be used to boot the SoC, and perform cryptographic processes such as producing or provisioning cryptographic keys or performing encryption or decryption operations. These modules can be interconnected via a system communication bus 416. Moreover, a dedicated cluster 426 comprising one or more sign and verify accelerators 418 can be located on the SoC 400. In some implementations, the sign and verify accelerators 418 can comprise low level hardware accelerators that can execute operations associated with cryptographic algorithms. In some SoC implementations, the sign and verify accelerators can comprise low-level physical PQC hardware accelerators and auxiliary functional blocks, including Custom Instruction Set extensions 420, Parallel Processing Units Controller 422, and Memory Access Optimization blocks 424. The SoC 400 includes one or more peripheral interfaces 428, which may conform to a standard such as JTAG, SPI/I2C, UART, USB, PCIe, SATA, DDR, and/or others for facilitating communication between the SoC 400 and external components of the system that includes the SoC 400. There are also software components 430 that can include various components of a software stack running on the SoC 400 such as development tools, compilers, libraries optimized for the hardware architectures, device drivers, and an operating system.

A CPU's role in an SoC can encompass coordinating and overseeing the fundamental activities of the SoC and its constituent components. Upon the arrival of a prepared data unit intended for signature or verification purposes, the data unit is directed to the sign and verify accelerators 418 segment of the system. Employing Custom Instruction Set Extensions 420, the prepared data unit can be stored in internal memory and partitioned into physical blocks within the sign and verify accelerator. In some implementations, a sign and verify accelerator can be configured as a PQC accelerator such that the prepared data unit is stored in internal memory and portioned into physical blocks within the PQC accelerator responsible for executing mathematical operations pertinent to PQC signature or verification. Secure communication can be established between the hardware security module 412 and the blocks associated with a PQC accelerator to safeguard the root of trust keys or other sensitive information. Following the generation of a signature for a specific prepared data unit, a signature object is appended to the data unit and transmitted out of the SoC 400 for further processing, e.g., storage or transmission. The reverse operation can be conducted when the system is utilized for integrity verification. The data package received by a verification module is partitioned into prepared data unit and signature object components. Subsequently, the signature object undergoes verification to ascertain its correctness. In the event of a positive verification, the prepared data unit is dispatched from the SoC 400 as verified data. Conversely, if the signature object is found to be incorrect or corrupted, the prepared data unit is discarded.

In some examples, a verification module utilized by a model entity to verify the signature objects of a data package can comprise the same combination of hardware architecture, software, and cryptographic algorithms as the signing module.

A secure communication channel (e.g., any of the secure communication channels 122, 172, 222) is utilized to provide a data package from a verification module to a trainer module and ensure that the data package arrives at the trainer module without any tampering or modification by an adversary. A secure communication channel can comprise wired or wireless interconnects, or some combination thereof. A secure communication channel can also comprise hardware or software implementations, or some combination thereof. Some wired implementations of a secure communication channel can comprise Peripheral Component Interconnect Express (PCIe), ethernet, Ultra Ethernet, InfiniBand, NVLink, or RapidIO configurations to establish a connection between the verification module and the trainer module over which the data package can be transmitted. Wireless data transfer implementations can also be used to transmit a data package from a verification module to a trainer module. For instance, a virtual private network (VPN) can be established between the verification module and the trainer module. In some implementations, security for sending a data package securely can be provided using a public key infrastructure, or symmetric key scheme based on a shared key, to encrypt the data package. Wireless protocols such as IPSec or Transport Layer Security (TLS) can also be used.

In some examples, a performance gain can be achieved using the proposed techniques. As an example, consider a rough estimate of the size in bytes to train a ChatGPT-like model with the following assumptions: (1) Data Size: dataset size of 100 GB (gigabytes) of raw text data. This estimation can vary depending on the specific dataset gathered. (2) Tokenization and Encoding: Language models typically use tokenization and encoding schemes that break down text into smaller units, an average token size can be about 4 bytes per token. Combining these factors, a rough estimation of performance gain can be calculated using the size of the text data, tokenization, and the model architecture:

$$\text{Estimated Size in Bytes} = \text{Size of Text Data} * \text{Average Bytes per Token} = \sim 100 \text{ GB} * 4 = \sim 400 \text{ GB of data}$$

Considering a dataset with 400,000,000 blocks, each consisting of 1024 bytes, and assuming a rough estimate of 5.4 milliseconds per block for signing with Dilithium algorithm and using a software (SW) based solution:

$$\text{Estimated Signing Time in hours} | \text{SW} = \text{Time per block} * \text{Number of blocks} = 5.4 \text{ milliseconds/block} * 400,000,000 \text{ blocks} = \sim 600 \text{ h}$$

The same using a hardware (HW) accelerator with ~1.88 ms per operation:

$$\text{Estimated Signing Time in hours} | \text{HW} = 1.88 \text{ milliseconds/block} * 400,000,000 \text{ blocks} = \sim 209 \text{ h}$$

If we consider a hypothetical scenario where a software-based Dilithium signing implementation takes 1.88 milliseconds per block, the performance gain with a hardware accelerator can be estimated as follows:

$$\text{Estimated Performance Gain} = \text{Time with Software Implementation} / \text{Time with Hardware Accelerator} = \sim 3\times$$

The actual value of ratio will depend on the specific hardware accelerator used and its efficiency. As a rough estimation, the performance gain with an improved hardware accelerator can be higher.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for securely providing data from a source entity for training a model of a model entity, the method comprising:

at the source entity:

receiving data configuration instructions associated with the model entity, transforming unprepared data from one or more data sources into prepared data based at least in part on the data configuration instructions, the prepared data comprising one or more prepared data units, producing, using a signing module, a data package comprising the one or more prepared data units and a respective signature object associated with each of the one or more prepared data units, and providing the data package to the model entity; and at the model entity:

accessing the provided data package, verifying, using a verification module, each of the signature objects associated with the prepared data units in the provided data package, and providing the prepared data to a trainer module using a secure communication channel configured to provide a trusted link between the verification module and the trainer module.

2. The method of claim 1, wherein providing the data package to the model entity comprises transmitting the data package from the source entity to the model entity over one or more communication channels.

3. The method of claim 2, wherein at least one communication channel of the one or more communication channels is routed through one or more intermediate entities configured to receive the data package and transmit the data package to a subsequent intermediate entity.

4. The method of claim 1, wherein providing the data package to the model entity comprises storing the data package at a storage medium for a period of time after which the model entity accesses the storage medium and verifies each of the signature objects associated with the prepared data units.

5. The method of claim 4, wherein providing the data package to the model entity further comprises verifying each of the signature objects associated with the prepared data units before storing the data package at the storage medium.

6. The method of claim 1, wherein the secure communication channel comprises a wired connection between the verification module and the trainer module.

7. The method of claim 6, wherein the wired connection comprises a peripheral component interconnect express connection.

8. The method of claim 1, wherein the secure communication channel comprises a wireless private network connection between the verification module and the trainer module.

9. The method of claim 1, wherein the trainer module comprises a hardware configuration and the data configuration instructions are based at least in part on the hardware configuration.

10. The method of claim 9, wherein the hardware configuration comprises one or more graphics processing units.

11. The method of claim 9, wherein the hardware configuration comprises one or more central processing units.

12. The method of claim 1, wherein the trainer module of the model entity comprises a model configuration and the data configuration instructions are based at least in part on the model configuration.

13. The method of claim 1, wherein the trainer module of the model entity comprises a machine learning framework and the data configuration instructions are based at least in part on the machine learning framework.

14. The method of claim 1, wherein the trainer module of the model entity comprises a development environment and the data configuration instructions are based at least in part on the development environment.

15. The method of claim 1, wherein the signature objects associated with each of the one or more prepared data units are generated based at least in part on at least one quantum resistant operation.

16. The method of claim 1, wherein the signature objects associated with each of the one or more prepared data units are generated based at least in part on a hash function.

17. The method of claim 1, wherein the signing module comprises a cryptographic module configured to generate signature objects associated with each of the one or more prepared data units, and the signature objects are based at least in part on at least one quantum resistant operation.

18. The method of claim 1, wherein the source entity comprises the signing module and the verification module.

19. The method of claim 1, wherein the signing module comprises specialized circuitry configured to produce the signature objects.

20. The method of claim 1, wherein the signing module comprises a particular hardware and software architecture, and the verification module comprise the same particular hardware and software architecture.

21. A system comprising:
a source entity configured to:
    receive data configuration instructions associated with the model entity,
    transform unprepared data from one or more data sources into prepared data based at least in part on the data configuration instructions, the prepared data comprising one or more prepared data units,
    produce, using a signing module, a data package comprising the one or more prepared data units and a respective signature object associated with each of the one or more prepared data units, and
    transmit the data package to the model entity over one or more communication channels; and
a model entity configured to:
    receive the transmitted data package from the model entity,
    verify, using a verification module, each of the signature objects associated with the prepared data units in the provided data package, and
    provide the prepared data to a trainer module using a secure communication channel configured to provide a trusted link between the verification module and the trainer module.

22. The system of claim 21, wherein the signing module comprises specialized circuitry configured for accelerating at least one quantum resistant computational operation.

23. The system of claim 21, wherein the verification module comprises specialized circuitry configured for accelerating at least one quantum resistant computational operation.

24. The system of claim 21, wherein the data configuration instructions comprise a hardware configuration associated with the model entity.

25. The system of claim 21, wherein the data configuration instructions comprise a development environment associated with the model entity.

26. The system of claim 21, wherein the secure communication channel comprises a wired connection, a wireless connection, or some combination thereof.

27. A system comprising:
a storage medium;
a source entity configured to:
    receive data configuration instructions associated with the model entity,
    transform unprepared data from one or more data sources into prepared data based at least in part on the data configuration instructions, the prepared data comprising one or more prepared data units,
    produce, using a signing module, a data package comprising the one or more prepared data units and a respective signature object associated with each of the one or more prepared data units, and
    store the data package in the storage medium; and
a model entity configured to:
    access the provided data package from the storage medium,
    verify, using a verification module, each of the signature objects associated with the prepared data units in the provided data package, and
    provide the prepared data to a trainer module using a secure communication channel configured to provide a trusted link between the verification module and the trainer module.

28. The system of claim 27, wherein the signing module comprises specialized circuitry configured for accelerating at least one quantum resistant computational operation.

29. The system of claim 27, wherein the verification module comprises specialized circuitry configured for accelerating at least one quantum resistant computational operation.

30. The system of claim 27, wherein the source entity prepares a plurality of data packages each associated with different respective data configuration instructions and stores the plurality of data packages in the storage medium.

31. A system for securely providing data for training a model, the system comprising:
a source entity comprising at least one processor and configured to:
    receive data configuration instructions associated with training the model,
    transform unprepared data from one or more data sources into prepared data based at least in part on the data configuration instructions, the prepared data comprising one or more prepared data units, and
    produce, using a signing module, a data package comprising the one or more prepared data units and a respective signature object associated with each of the one or more prepared data units;

wherein the signing module comprises specialized circuitry configured for accelerating at least one quantum resistant computational operation.

32. The system of claim 31, wherein a quantum resistant operation that the specialized circuitry is configured to accelerate is a post-quantum cryptography algorithm.

33. The system of claim 32, wherein the specialized circuitry includes circuitry configured to accelerate one or more of the following operations: modular exponentiation of large integers, multiplication of points on an elliptical curve, polynomial multiplication, or Keccak algorithms.

34. The system of claim 31, wherein each signature object is generated at least in part using a hash function.

35. The system of claim 31, wherein the data configuration instructions comprise a hardware configuration associated with training the model.

36. A system for securely receiving data for training a model, the system comprising:

a model entity comprising at least one processor and configured to:

access a data package comprising the one or more prepared data units and a respective signature object associated with each of the one or more prepared data units, where the prepared data units were prepared based at least in part on the data configuration instructions associated with training the model, verify, using a verification module, each of the signature objects associated with the prepared data units in the provided data package, and provide the prepared data to a trainer module using a secure communication channel configured to provide a trusted link between the verification module and the trainer module;

wherein the verification module comprises specialized circuitry configured for accelerating at least one quantum resistant computational operation.

37. The system of claim 36, wherein the specialized circuitry of the verification module is configured for accelerating at least one quantum resistant computational operation associated with a post-quantum cryptography algorithm.

38. The system of claim 36, wherein the secure communication channel comprises a wired connection between the verification module and the trainer module.

39. The system of claim 36, wherein the secure communication channel comprises a wireless connection between the verification module and the trainer module.

40. The system of claim 36, wherein the secure communication channel comprises a combination of at least one wireless connection and at least one wired connection between the verification module and the trainer module.

41. The system of claim 36, wherein a quantum resistant operation that the specialized circuitry is configured to accelerate is a post-quantum cryptography algorithm.

42. The system of claim 41, wherein the specialized circuitry includes circuitry configured to accelerate one or more of the following operations: modular exponentiation of large integers, multiplication of points on an elliptical curve, polynomial multiplication, or Keccak algorithms.

* * * * *